(12) United States Patent
Stock et al.

(10) Patent No.: US 10,934,916 B2
(45) Date of Patent: Mar. 2, 2021

(54) DEVICE HAVING AN ELECTRICAL HEATER FOR EVAPORATING A FLUID

(71) Applicant: CPT GROUP GmbH, Hannover (DE)

(72) Inventors: Holger Stock, Siegburg (DE); Rolf Brück, Bergisch Gladbach (DE); Peter Hirth, Rösrath (DE); Marc Brugger, Neunkirchen-Seelscheid (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/464,049

(22) PCT Filed: Nov. 20, 2017

(86) PCT No.: PCT/EP2017/079713
§ 371 (c)(1),
(2) Date: May 24, 2019

(87) PCT Pub. No.: WO2018/095838
PCT Pub. Date: May 31, 2018

(65) Prior Publication Data
US 2019/0383190 A1    Dec. 19, 2019

(30) Foreign Application Priority Data
Nov. 28, 2016    (DE) ..................... 10 2016 223 578.8

(51) Int. Cl.
*F01N 3/20*    (2006.01)
*F01N 3/28*    (2006.01)

(52) U.S. Cl.
CPC ......... *F01N 3/2066* (2013.01); *F01N 3/2892* (2013.01); *F01N 2240/16* (2013.01);
(Continued)

(58) Field of Classification Search
CPC .. F01N 2240/16; F01N 3/0892; F01N 3/2013; F01N 3/2066; F01N 3/08–38; F01N 2610/02
See application file for complete search history.

(56) References Cited

U.S. PATENT DOCUMENTS 6,955,042 B1 * 10/2005 Wnuck .................. F01N 3/035
60/286
7,267,805 B2 * 9/2007 Bruck ...................... F01N 3/01
422/177
(Continued)

FOREIGN PATENT DOCUMENTS

DE    199 22 959    11/2000
DE    102 54 764    6/2004
(Continued)

OTHER PUBLICATIONS

International Search Report issued in corresponding PCT/EP2017/079713.
(Continued)

*Primary Examiner* — Laert Dounis
(74) *Attorney, Agent, or Firm* — Cozen O'Connor

(57) ABSTRACT

A device for cleaning exhaust gases includes: a housing configured such that exhaust gas is flowable through the housing in a main throughflow direction; an injector configured to dose a fluid into a region of the housing through which exhaust gas flows; an evaporator arranged in the housing, the evaporator having a plurality of surface elements extending along the main throughflow direction of the housing, and the fluid being dosable into the fluid along a direction extending perpendicularly to the main throughflow direction of the housing; and a heater configured to electrically heat the evaporator.

10 Claims, 2 Drawing Sheets

(52) U.S. Cl.
CPC ...... *F01N 2240/20* (2013.01); *F01N 2610/02* (2013.01); *F01N 2610/102* (2013.01); *F01N 2900/1811* (2013.01); *Y02T 10/12* (2013.01)

(56) References Cited

U.S. PATENT DOCUMENTS

| | | | | |
|---|---|---|---|---|
| 2004/0221572 | A1* | 11/2004 | Treiber | B01D 46/2451 60/297 |
| 2007/0003458 | A1* | 1/2007 | Gschwind | B01D 53/9431 422/199 |
| 2012/0073274 | A1* | 3/2012 | Uno | F01N 13/009 60/299 |
| 2013/0263941 | A1* | 10/2013 | Landes | B01D 35/005 137/351 |
| 2015/0152766 | A1* | 6/2015 | Brunel | B01J 19/24 422/148 |
| 2015/0315943 | A1* | 11/2015 | Gschwind | B01F 5/0616 422/180 |
| 2017/0254246 | A1* | 9/2017 | Chini | H05B 1/0236 |

FOREIGN PATENT DOCUMENTS

| | | |
|---|---|---|
| DE | 10 2012 000 597 | 7/2013 |
| DE | 10 2014 117 687 | 6/2015 |
| EP | 1 967 712 | 9/2008 |
| JP | H 07 13424 | 3/1995 |

OTHER PUBLICATIONS

Written Opinion issued in corresponding PCT/EP2017/079713.
German Office Action issued in corresponding German application No. 10 2016 223 578.8.

\* cited by examiner

DEVICE HAVING AN ELECTRICAL HEATER FOR EVAPORATING A FLUID

CROSS REFERENCE TO RELATED APPLICATIONS

This is a U.S. national stage of International application No. PCT/EP2017/079713, filed on Nov. 20, 2017, which claims priority to German Application No. 10 2016 223 578.8, filed Nov. 28, 2016, the content of each of which is incorporated herein by reference.

BACKGROUND OF THE INVENTION

1. Field of the Invention

The invention relates to a device for cleaning exhaust gases.

2. Description of the Prior Art

Different components are used in exhaust tracts of internal combustion engines in order to achieve as comprehensive an aftertreatment as possible of exhaust gases of the internal combustion engine. Known in this respect are, inter alia, so-called SCR systems, which are used primarily in diesel engines for converting the nitrogen oxides in the exhaust gas. For this purpose, fluid is injected into the exhaust tract in order, in this way, to trigger conversion of the nitrogen oxides in the exhaust gas to nitrogen and water. So-called SCR (selective catalytic reduction) systems are known in a wide variety of embodiments in the prior art. An aqueous urea solution is preferably used as fluid.

In order to ensure this conversion of the exhaust gas, the aqueous urea solution is normally injected into the exhaust tract, with the urea solution in particular being sprayed onto structures in the exhaust tract that undergo heating by the exhaust gas. If a certain minimum temperature is achieved here, the evaporation of the aqueous urea solution begins, which results in the release of ammonia, which in turn reacts with the nitrogen oxides to form nitrogen and water.

In the exhaust-gas systems known to date in the prior art, the heating of the structures used for evaporation takes place by convection of heat from the flowing exhaust gas. The heating is thus directly dependent on the exhaust-gas temperature, as a result of which, in particular in the case of a cold start, an injection of the aqueous urea solution can be begun only at a relatively late stage. Also, in low load ranges, which possibly lead to an exhaust-gas temperature which is not sufficiently high, it may be the case that the injection is realized after a delay or is absent altogether. Moreover, with falling exhaust-gas temperatures, chemical secondary reactions can occur, which can give rise to deposits on the evaporation elements or in the exhaust tract in general. The deposits can result in the effectiveness of the exhaust-gas aftertreatment system being impaired.

SUMMARY OF THE INVENTION

It is therefore an object of the present invention to provide an exhaust-gas aftertreatment system that permits optimized heating of the structures in the exhaust tract used for evaporation, wherein in particular, it is ensured that the temperature necessary for the evaporation of the fluid is reached relatively quickly. It is also the object of the invention to provide a method for operating the device.

In accordance with one aspect of the invention a device is provided for cleaning exhaust gases, having a housing through which exhaust gas is able to flow, having an injector for dosing in a fluid, the fluid being able to be dosed into the region through which exhaust gas is able to flow, and having an evaporator arranged in the housing, wherein the evaporator has a plurality of surface elements which extend along the main throughflow direction of the housing, and the fluid is able to be dosed in along a direction that extends perpendicularly with respect to the main throughflow direction, wherein the evaporator is able to be electrically heated by a heater.

For the purpose of the conversion of the nitrogen oxides contained in the exhaust gas, use is preferably made of an aqueous urea solution as fluid. The evaporation of the aqueous urea solution results in the formation of ammonia in the exhaust tract, which ammonia reacts with the nitrogen oxides to form nitrogen and water.

The surface elements advantageously extend along the throughflow direction of the housing. This is necessary for keeping as low as possible the pressure loss, arising due to the surface elements, in the exhaust tract. This at the same time makes the heating of the surface elements more difficult, the heating being realized in known embodiments merely by heat transfer from the flowing exhaust gas.

In order to ensure the quickest possible heating of the surface elements, it is therefore necessary for an additional heating source to be provided, which advantageously leads to heating of the surface elements independently of the actual exhaust-gas stream. Quicker heating allows the evaporation of the fluid, which evaporation is necessary for the operation of the exhaust-gas aftertreatment device, to begin at an earlier stage, which makes possible, in particular in the case of a cold start of the internal combustion engine, quicker completion of exhaust-gas aftertreatment.

The dosing or spraying of the fluid onto the surface elements at a right angle is advantageous since the fluid is thereby distributed particularly well and comes into contact with the largest possible reaction surface, as a result of which the evaporation is improved. In an advantageous configuration, the surface elements are arranged such that, when viewed from the dosing-in point, they are not situated in direct alignment with one another, whereby it would be possible for more remotely situated surface elements to be situated for example in a shadow of a surface element arranged closer to the dosing-in point.

It is particularly advantageous if the heater is formed by a resistance heating element in the form of a heating conductor. The heating via a resistance heating element is particularly advantageous, since it is simple to realize and the shaping of the heater is subjected to only a few criteria. Resistance heating is known in a wide variety of application areas and can thus be realized inexpensively and reliably. The resistance heating element may be formed for example by a conductor, through which a current flows, in the form of a wire or of a honeycomb body. The surface elements may be arranged in a manner electrically insulated with respect to the heating conductor, with the result that the surface elements themselves are not heated by the effect of the resistance heating. In this case, the heating of the surface elements takes place by convection from the heating conductor itself and in that the flowing exhaust gas is heated by the heating conductor before it flows along the surface elements.

Alternatively, it is also possible for the surface elements to be directly electrically conductively connected to the heater, whereby the surface elements are likewise heated by the effect of the resistance heating.

It is also advantageous if the heater is formed by one or more PTC heating elements. PTC (positive temperature coefficient) heating elements are well known in the prior art. PTC heating elements can be used in a target manner for the heating of the exhaust gas by applying a voltage to them. It is possible, in a manner dependent on the selected material and the applied voltage, for predefined heating of the PTC elements to be achieved.

It is also preferable if the surface elements are formed by PTC heating elements that project from a support element, which is able to be flowed through, along the main throughflow direction of the housing. The formation of the surface elements by the PTC heating elements themselves is advantageous since, in this way, a particularly compact heating device is able to be provided. Furthermore, it is in particular the case that the pressure loss as a result of the heater is minimized, while a relatively large heated surface is nevertheless in contact with the flowing exhaust gas. Since the fluid is directly dosed onto the surface elements at a right angle, it is possible by direct heating of the surface elements also to achieve evaporation of the fluid independently of the temperature of the exhaust-gas stream. This is particularly advantageous since the heating duration up to the attainment of the evaporation temperature of the fluid is thus substantially determined by the characteristics of the PTC heating elements and is independent of the heating of the exhaust gas.

It is furthermore advantageous if an exhaust gas-resistant film is wound around the PTC heating elements. This is advantageous both for keeping damaging influences of the exhaust gas away from the PTC heating elements and for avoiding the unwanted chemical reaction of the PTC heating elements with the fluid, the conversion products or the exhaust gas.

It is furthermore advantageous if the heater is formed by a heating disk arranged upstream of the evaporation device along the main throughflow direction. A heating disk is advantageous since, firstly, the exhaust gas can flow through it relatively unhindered, and secondly, a surface, large on the basis of the volume, for heating the flowing exhaust-gas stream is generated. Advantageously, such a heating disk is designed in the form of a honeycomb body having a plurality of flow channels which extend along the main throughflow direction.

It is also expedient if the heating device has a single or multiple heating conductor(s), which is/are press-fitted on a support element. Press-fitted heating conductors offer the advantage that the course of the heating conductors is able to be configured freely.

It is furthermore advantageous if the heating disk is formed by a metallic honeycomb body that has a multiplicity of flow channels extending along the main throughflow direction of the housing, wherein the surface elements are inserted in individual flow channels and project from the heating disk along the main throughflow direction of the housing.

Such a construction is advantageous since heating disks of this type are simple to produce and are able to be produced in a wide variety of structural forms. As a result of the insertion of the surface elements in the flow channels, it can be achieved that the surface elements are directly concomitantly heated by the physical contact. If the heating disk is designed in the form of a resistance heater and the surface elements are configured so as not to be electrically insulated from the heating disk, the surface elements are likewise concomitantly heated by the effect of the resistance heating. If electrical insulation is provided, the heat is transferred directly to the surface elements from the heating disk by the material contact.

It is furthermore expedient if the surface elements of the heater are positioned in the housing such that the fluid able to be dosed in by the injector is able to be sprayed onto the surface elements substantially perpendicularly with respect to the main throughflow direction. This is advantageous for generating the largest possible effective surface on the surface elements, in order that the fluid can be evaporated as completely as possible as quickly as possible. As a result of the perpendicular spraying, it is achieved that the fluid spreads through the exhaust-gas flow as far as possible in an axial direction, and thus absorbs as much of the heat emitted by the surface elements as possible in order to be evaporated in this way. Spraying at an angle significantly below 90 degrees leads to more fluid being entrained by the exhaust-gas flow before it can be evaporated by the surface elements, which evaporation would impair the exhaust-gas aftertreatment.

In accordance with another aspect of the invention there is provided a method, wherein the temperature of the exhaust gas and/or the temperature of the evaporator are/is detected and the dosing-in of the fluid is realized, in a manner dependent on a predefinable minimum temperature, only when the predefinable minimum temperature has been reached. This is advantageous for avoiding the situation in which the fluid is dosed in at excessively low temperatures, in particular below the evaporation temperature, and the fluid thereby remains in the exhaust tract in liquid form.

Non-evaporated fluid can lead to damage of the exhaust tract and, in the worst case, can also escape from the exhaust system with the exhaust gas, causing the solution to be released into the environment. Furthermore, in some operating situations, liquid constituent parts in the exhaust gas can also find their way into the intake system of the internal combustion engine, which can cause damage to the internal combustion engine itself.

It is furthermore preferable if, with a fall below the minimum temperature, the heater is activated in order for the evaporator to be heated to, or to above, the minimum temperature. This is advantageous for ensuring that a sufficient temperature for the evaporation of the fluid always prevails. Otherwise, sufficient exhaust-gas aftertreatment cannot be ensured.

Advantageous refinements of the present invention are described below and in the following description of the figures.

BRIEF DESCRIPTION OF THE DRAWINGS

The invention will be explained in detail in the following text with reference to the drawings, in which.

DETAILED DESCRIPTION OF THE PRESENTLY PREFERRED EMBODIMENTS

Figure 1:
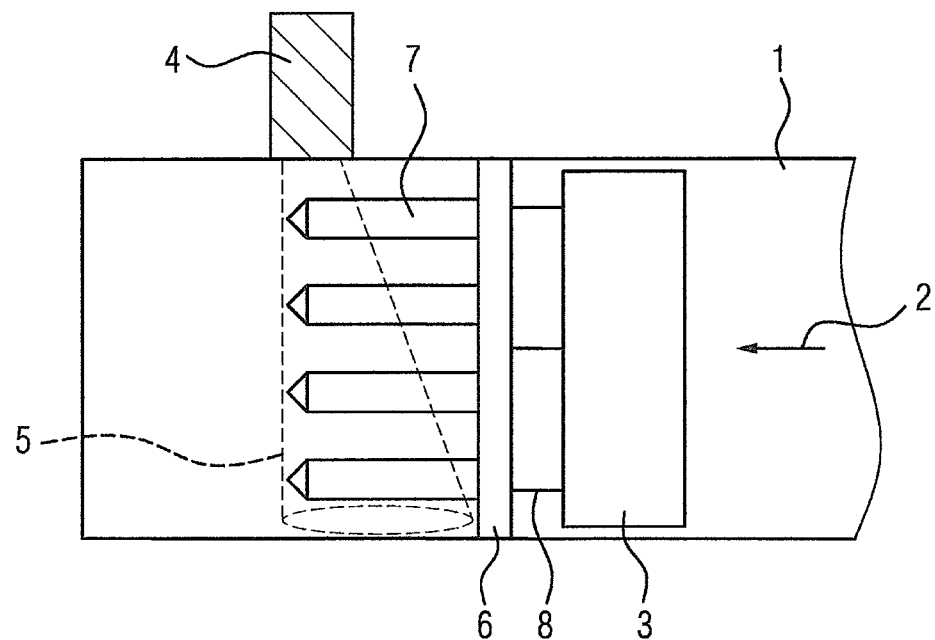
FIG. 1 shows a sectional view through an exhaust tract, wherein arranged downstream of a first catalytic converter in the flow direction of the exhaust gas are a heater and an evaporator, onto which a fluid can be sprayed.

FIG. 1 shows a section through a housing 1 which forms an exhaust tract. Exhaust gas is able to flow through the housing 1 along the main throughflow direction 2. With the reference sign 3, a single catalytic converter 3, through which the exhaust gas is able to flow, is illustrated in a manner representative of a multiplicity of possible catalytic converters.

Arranged downstream of the catalytic converter 3 along the main throughflow direction 2 is a heating disk 6, from which a plurality of surface elements 7 project in a manner parallel to the main throughflow direction 2. The surface elements 7 may be formed for example by pins inserted in openings formed, for example, by the flow channels of the heating disk. The surface elements 7 thus enlarge the heated surface, whereby better and in particular quicker evaporation of the fluid dosed in can be achieved.

The urea solution can be dosed into the housing 1 via the injector 4 arranged laterally on an outer wall of the housing 1. From there, the urea solution spreads conically 5 into the housing 1 and impinges, preferably at a right angle to the main throughflow direction 2, on the surface elements 7 extending along the main throughflow direction 2.

The surface elements 7 enlarge the heating surface of the heating disk 6. Due to the direct contact with the heating disk 6, the surface elements 7 are concomitantly heated.

In the exemplary embodiment in FIG. 1, the heating disk 6 is spaced apart from the catalytic converter 3 via spacer elements 8. This constitutes merely one advantageous embodiment. In alternative configurations, it is also possible for the heating disk, or generally the heater, to be fastened in the housing in some other way.

Figure 2:
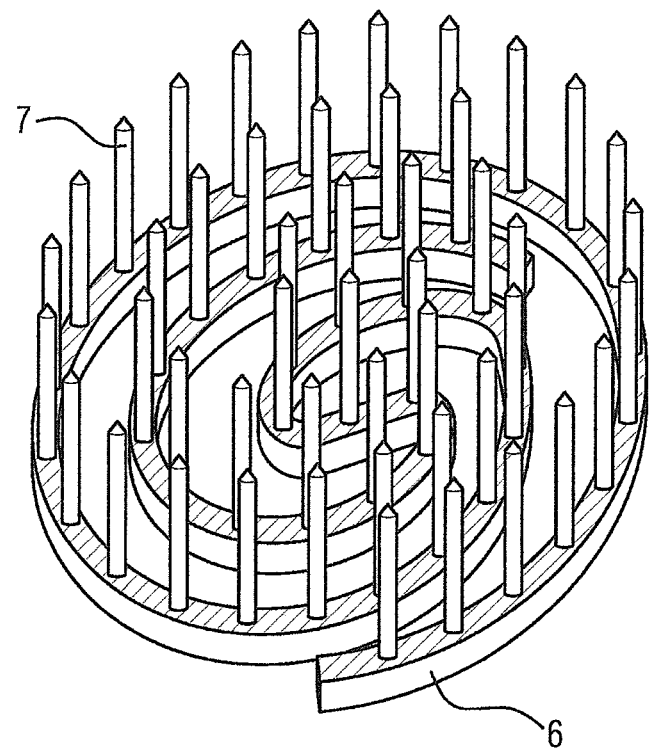
FIG. 2 shows a perspective view of a heating disk with a multiplicity of surface elements which are part of the evaporator and project from the heating disk.

FIG. 2 shows a perspective view of a heating disk 6 with a plurality of surface elements 7. In this exemplary embodiment, the surface elements 7 are in the form of cylindrical pins and are distributed along the heating disk 6. The heating disk 6 is formed by a piece of metal wound in a meandering manner and which is able to be electrically heated. The surface elements 7 may also have different formations.

Figure 3:
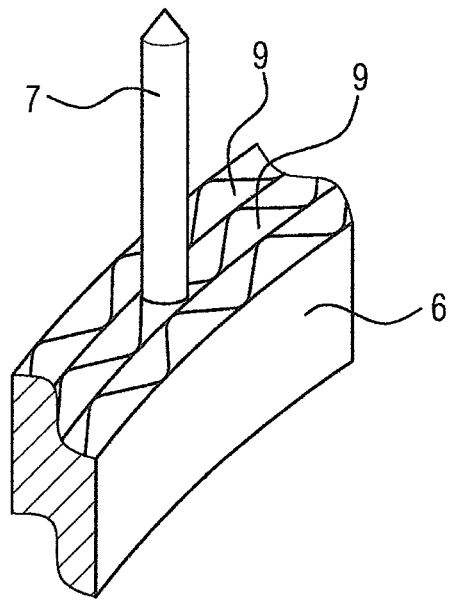
FIG. 3 shows a detail view of a surface element in the form of a pin and which is inserted in a flow channel of a honeycomb body which forms the heating disk.

FIG. 3 shows a detail view of a pin 7 inserted in one of the flow channels 9 in the heating disk 6. Here, the heating disk 6 is formed as a honeycomb body from a plurality of smooth layers and corrugated layers stacked one above the other, the flow channels 9 being formed between the smooth layers and corrugated layers.

Preferably, the pins 7 are configured such that they can be inserted into the flow channels 9 with an accurate fit. Due to the direct contact between the pins 7 and the heating disk 6, the pins 7 are directly concomitantly heated with the heating disk 6.

Figure 4:
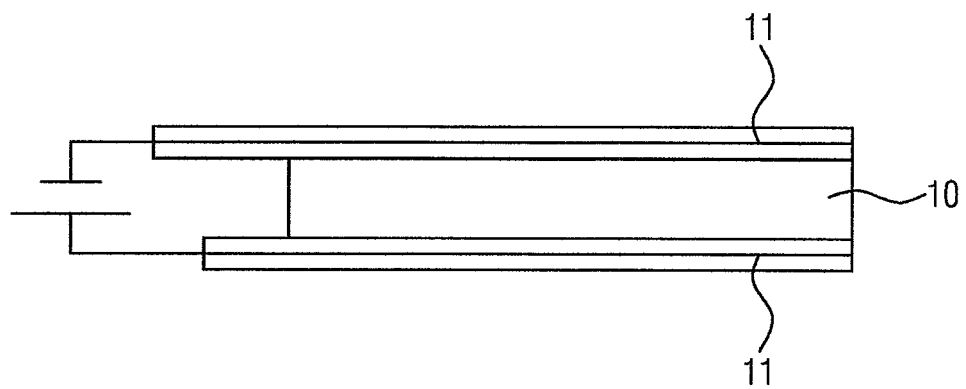
FIG. 4 shows a sectional view of a heater in the form of a PTC heating element, wherein a protective film is wound around the PTC heating element.

FIG. 4 shows a surface element 7, which is preferably formed by a PTC heating element. A PTC element 10 or, in an alternative embodiment, a simple heating conductor, is arranged in the core of the surface element. Thus, via the application of a voltage, it is possible for defined heating to be achieved.

In the exemplary embodiment in FIG. 4, a film 11 is wound around the PTC heating element (or simple heating conductor) 10, which film for example protects the PTC heating element (or simple heating conductor) 10 against the corrosive properties of the exhaust gas flowing past or against the chemical properties of the urea solution.

Such PTC heating elements (or simple heating conductors) 10 may be inserted instead of the pins into a heating disk as has been shown in the preceding figures. However, it is also possible to make use of a support element which is inherently non-heatable and to achieve the heating wholly by way of the PTC heating elements (or simple heating conductors) 10.

The different features of the individual exemplary embodiments can also be combined with one another. The exemplary embodiments in FIGS. 1 to 4 are in particular not of a limiting nature and serve for illustrating the concept of the invention.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for cleaning exhaust gases, comprising:
  a housing (1) configured such that exhaust gas is flowable through the housing (1) in a main throughflow direction (2);
  an injector (4) arranged laterally on an outer wall of the housing and configured to dose a fluid into a region of the housing through which exhaust gas flows; and
  a heater having:
    (a) a heating disk (6) arranged in the housing (1) and having flow channels (9) formed therein, and
    (b) an evaporator arranged in the housing downstream of the heating disk (6), wherein the evaporator has a plurality of surface elements (7) extending along the main throughflow direction (2) of the housing (1), each of the surface elements (7) comprising a cylindrical pin inserted into an opening of one of the flow channels (9) of the heating disk (6), the surface elements (7) being heated by direct contact with the heating disk (6),
  wherein the injector (4) is arranged and configured to dose the fluid into the exhaust gas along a direction extending perpendicularly to the main throughflow direction (2) of the housing (1) so that the dosed fluid impinges onto the surface elements (7) of the evaporator that extend along the main throughflow direction (2).

2. The device as claimed in claim 1, wherein the heater (6) comprises a resistance heating element configured as a heating conductor.

3. The device as claimed in claim 2, wherein the heater comprises one or more positive temperature coefficient (PTC) heating elements (10).

4. The device as claimed in claim 3, wherein the surface elements of the heater comprise the one or more positive temperature coefficient (PTC) heating elements (10), the one or more positive temperature coefficient (PTC) heating elements each projecting from a support element, which is configured to be flowed through, along the main throughflow direction (2) of the housing (1).

5. The device as claimed in claim 4, further comprising an exhaust gas-resistant film (11) wound around the PTC heating elements (10).

6. The device as claimed in claim 1, wherein the heater has a support element and a single or multiple heating conductor(s) press-fitted on the support element.

7. The device as claimed in claim 1, wherein the heating disk (6) comprises a metallic honeycomb body having the plurality of flow channels (9) extending along the main throughflow direction (2) of the housing (1), wherein each of the plurality of surface elements (7) is arranged in a respective one of the plurality of flow channels (9) and projects from the heating disk (6) along the main throughflow direction (2) of the housing (1).

8. The device as claimed in claim 1, wherein the surface elements (7) of the heater are positioned in the housing (1) such that the fluid dosed by the injector (4) impinges on onto the surface elements (7) substantially perpendicularly with respect to the main throughflow direction (2).

9. A method for operating a device as claimed in claim 1, comprising detecting a temperature of the exhaust gas and/or a temperature of the evaporator; and dosing the fluid in a manner dependent on a predefinable minimum temperature, only when the predefinable minimum temperature has been reached.

10. The method for operating a device as claimed in claim 9, further comprising, in a case in which the temperature of the exhaust gas and/or the temperature of the evaporator falls below the minimum temperature, activating the heater to heat the evaporator to, or to above, the minimum temperature.

* * * * *